United States Patent [19]

Tanaka et al.

[11] Patent Number: 4,663,665
[45] Date of Patent: May 5, 1987

[54] TV SYSTEM CONVERSION APPARATUS

[75] Inventors: Yutaka Tanaka; Taiji Nishizawa; Yuichi Ninomiya; Toshiro Ohmura; Taiichiro Kurita; Yoshimichi Ohtsuka, all of Tokyo, Japan

[73] Assignee: Nippon Hoso Kyokai, Japan

[21] Appl. No.: 814,493

[22] Filed: Dec. 30, 1985

[30] Foreign Application Priority Data

Jan. 7, 1985 [JP] Japan ......... 60-712
Aug. 15, 1985 [JP] Japan ......... 60-179898

[51] Int. Cl.⁴ .................. H04N 7/01
[52] U.S. Cl. .............. 358/140; 358/105
[58] Field of Search .......... 358/140, 105, 136, 11

[56] References Cited

U.S. PATENT DOCUMENTS

| 4,057,835 | 11/1977 | Kinuhata et al. | 358/140 |
| 4,240,101 | 12/1980 | Michael | 358/11 |
| 4,322,750 | 3/1982 | Lord | 358/140 |
| 4,383,272 | 5/1983 | Netrauali | 358/105 |
| 4,494,144 | 1/1985 | Brown | 358/105 |
| 4,543,607 | 9/1985 | Taylor | 358/140 |
| 4,551,753 | 11/1985 | Nishizawa | 358/140 |
| 4,590,607 | 5/1986 | Kauth | 358/105 |

FOREIGN PATENT DOCUMENTS

1525915 9/1978 United Kingdom .
2129651 5/1984 United Kingdom .

Primary Examiner—Howard W. Britton
Attorney, Agent, or Firm—Parkhurst & Oliff

[57] ABSTRACT

The picture quality deterioration such as judder caused by TV frame number conversion can be mitigated by selecting either the stationary original picture signal or the motion-compensated interpolated picture signal based on the most adaptive motion vector corresponding to the smallest interframe difference between the original picture signal and the motion-compensated picture signals based on the motion vectors individually detected from divisional picture areas. The effect of this mitigation can be increased by weighting the detected motion vectors and by smoothing the contour between motion-compensated picture areas with the aid of filtering.

6 Claims, 23 Drawing Figures

FIG_6a
30 Divisional Picture Area

FIG_6b
31 Motion Vector Detection Subblock

FIG_6c
Motion Vector $v_n$

$P_{ij}$

FIG_6d
Weighting Factor 2
Weighting Factor 1

Vertical
Horizontal

FIG_6e
Weighting Factor 2

Weighting Factor 1

FIG_6f
Weighting Factor 2

Weighting Factor 1

FIG_9

FIG_10

TV SYSTEM CONVERSION APPARATUS

BACKGROUND OF THE INVENTION

Field of the Invention and Related Art Statement

The present invention relates to a TV system conversion apparatus provided for converting numbers of picture frames and scanning lines of a television picture signal, particularly, for facilitating the mitigation of deterioration of picture quality such as ambiguity and judder which is caused in plural motional portions of a picture in company with the system conversion.

Figure 1:
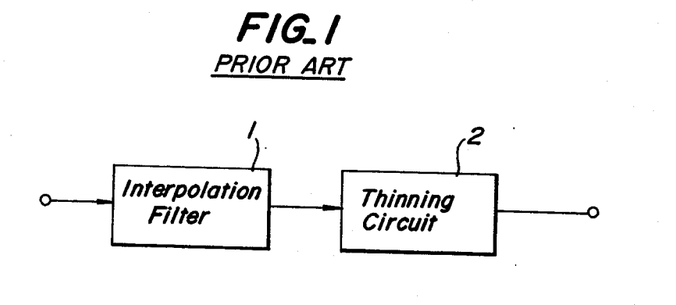
FIG. 1 is a block diagram showing an outlined constitution of a conventional TV system conversion apparatus as mentioned before.
Figure 2:
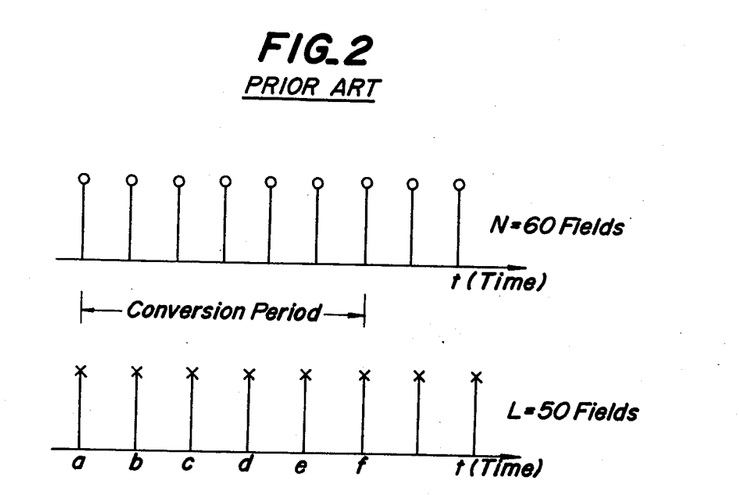
FIG. 2 is a diagram showing an example of the manner of TV frame number conversion as mentioned before.

In a conventional type TV system conversion apparatus provided for converting a television picture signal of M line/N field system into that of different K line/L field system, the spatio-temporal linear processing of a picture signal is effected through an interpolation filter 1 and a thinning circuit 2, as shown in FIG. 1, so as to convert numbers of picture fields per second and scanning lines. For example, when an input TV picture signal of field number N system of fields per second N=60 is converted into an output TV picture signal of field number L system of fields per second L=50, a conversion period during which 6 fields of Nos. 1 to 6 of the input picture signal are converted into 5 fields of Nos. "a" to "e" of the output picture signal is provided, as shown in FIG. 2. In this exemplified conversion of the number of picture fields, when the picture signal linear processing for obtaining a weighted average of two continued fields of the input picture signal is effected, so as to form a new field of the output picture signal which is situated between those two continued fields, such a serious defect is brought out that, if the picture is motional, the positions of the picture in those two continued fields prepared for obtaining the weighted average thereof are shifted from each other, and hence the ambiguity and the judder are caused in edge positions of the picture and the conspicuous deterioration of picture quality results therefrom.

The above described defect is necessarily caused by the aforesaid conventional simple linear interpolation. Meanwhile, in "a TV system conversion system" as proposed in the specification of Japanese patent application No. 244,638/84, which was filed by the same applicants as the present application, a remarkable improvement of the above defect caused in ordinary TV pictures can be obtained by the interpolation effected after the shifted positions of the picture are compensated in response to the detection of the motion of picture and the motion vector. In fact, the most of ordinary TV pictures contain only simple motions such as generated by panning and tilting which are effected for following a specified target, so that fair effects can be obtained by the above picture processing. However, in a situation where plural motional portions, which are comparatively noticeable and present individual motions being different from each other, are contained in the same TV picture, a further defect such as the effect of improvement of picture quality can not be sufficiently obtained is brought out from the above described prior picture processing.

SUMMARY OF THE INVENTION

An object of the present invention is to remove the above further defect and hence to provide a TV system conversion apparatus wherein the deterioration of picture quality which is caused in the resultant converted picture on the basis of the motion of picture can be sufficiently mitigated, even when plural different motional portions are contained in the TV picture to be applied with the system conversion.

In connection therewith, the TV system conversion apparatus according to the present invention, which is provided for converting the number of picture frames employed in TV systems, is featured by comprising means for forming a linear interpolated picture signal of a new frame from original picture signals of two continued frames of Nos. N and N+1 through the linear interpolation, means for detecting motion vectors individually corresponding to the directions and the distances of picture motions in a plurality of picture regions formed by dividing the original pictures respectively, means for forming a plurality of motion-compensated interpolated picture signals of said new frame from a plurality of motion-compensated picture signals of said two continued frames of Nos. N and N+1 formed by compensating said original picture signals in response to said motion vectors and means for selecting in response to absolute values of respective interframe differences between said original picture signals of said two continued frames of Nos. N and N+1 and said plurality of motion-compensated picture signals of said two continued frames of Nos. N and N+1 either said linear interpolated picture signal or said motion-compensated interpolated picture signal corresponding to the smallest of said absolute values of interframe differences, so as to form a converted output picture signal adapted to the picture motion.

BRIEF DESCRIPTION OF THE DRAWINGS

For the better understanding of the invention, reference is made to the accompanying drawings, in which.

Throughout different views of the drawings, 1 denotes an interpolation filter; 2 denotes a thinning circuit; 3, 49 denote frame memories; 4 denotes a frame ordering circuit; 5, 6, 8, 13, 50, 51 denote coefficient multipliers; 7, 12, 14, 21, 23, 54, 55, 56, 72, 73, 74, 75 denote adders; 9, 10, 16, 17, 18, 19 denote motion compensation buffer memories; 11 denotes a motion and motion-vector detecting circuit; 15, 22, 24, 60, 61, 62, 63 denote subtractors; 20 denotes a motion vector detecting circuit; 25, 26, 27, 64, 65, 66, 67 denote absolute circuits; 28 denotes a signal selecting circuit; 29 denotes a minimum value label detecting circuit; 30 denotes a divisional picture area; 31 denotes a motion vector detection sub-block; 32, 45, 46, 47 denote area filters; 33, 34, 35, 36 denote 1H memories; 37, 42 denote total summers; 38, 39, 40, 41 denote 1 sample memories; 43 denotes a comparator; 44 denotes a minimum value deciding circuit; 48 denotes a maximum value deciding circuit; 52, 53, 57, 58, 59 denote buffer memories; 68, 69, 70, 71 denote vector examination circuits; and 76 denotes a minimum value vector label detector.

DETAILED DESCRIPTION OF PREFERRED EMBODIMENTS

Prior to the description of preferred embodiments of the present invention, the embodiment as described in the specification of aforesaid Japanese Patent Application No. 244,638/84 filed by the same applicant, so as to facilitate the better understanding of the present invention by referring to the drawing.

Figure 3:
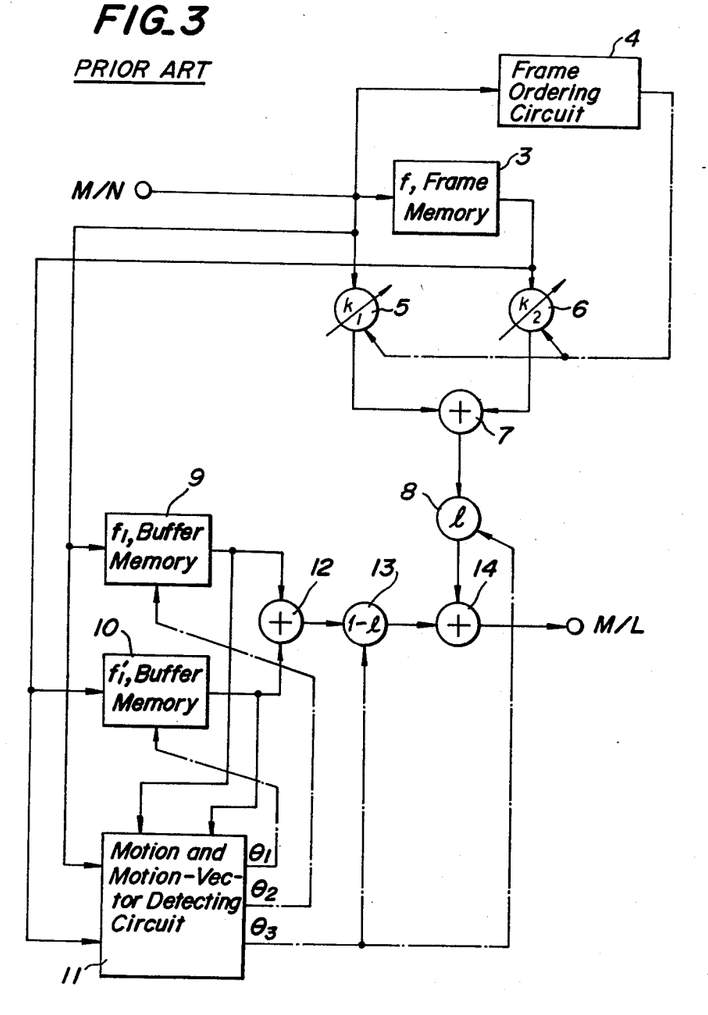
FIG. 3 is a block diagram showing a prior motion-compensated TV frame number converter.
Figure 4A:
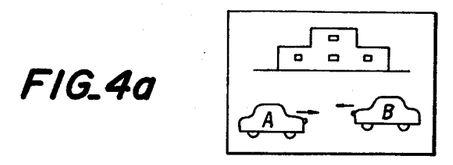
FIGS. 4(a), 4(b) 4(c), 4(d) and 4(e) are diagrams successively showing examps of motion compensation according to the present invention.
Figure 4B:
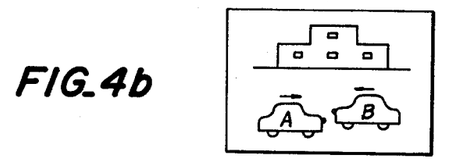
Figure 4C:
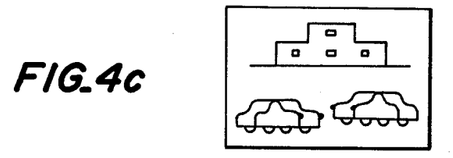
Figure 4D:
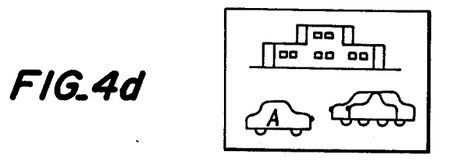
Figure 4E:
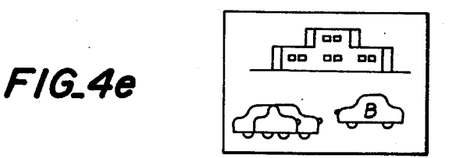

An example of the constitution of a motion-compensated frame number converting section of a TV system conversion apparatus as described in the above specification is shown in FIG. 3. In this frame number converting section, a sequentially scanned picture signal is supplied to linear interpolation filters 3, 5, 6, 7, motion-compensation buffer memories 9, 10 and a motion and motion-vector detecting circuit 11. The linear interpolation filters 3, 5, 6, 7 are employed, similarly as in the conventional usual apparatus, for performing the inear interpolation effected by the weighted average of the picture signals of two continued frames upon the input sequentially scanned picture signal, so as to form a new interpolated picture signal. Meanwhile, the motion-compensation buffer memories 9, 10 are employed for forming a motion-compensated interpolated picture signal in which the signal waveforms corrupted by the picture motion are compensated by reading-out the picture signal from the memory addresses controlled by the control signals $\theta_1$ and $\theta_2$ respectively corresponding to one-directional motion vectors, that is, the directions of motion effected by panning and tilting the picture camera and the timings of frame interpolation, which are detected in the motion and motion-vector detecting circuit 11 from the original picture signals once memorized in those buffer memories 9, 10. In this connection, these control signals $\theta_1$ and $\theta_2$ are formed regarding every picture frames, that is, every converted picture frames.

In a situation where a body, for instance, a person moving at the velocity $v_1$ is picked up together with a background, for instance, a tree by a TV camera under the panning at the same velocity $v_1$, the moving body is moved in a direction parallel with the direction of the panning at the same velocity, so that a relative velocity of the moving body against the TV camera becomes zero and hence the moving body is presented as a stational picture area in the displayed picture, meanwhile the stationary background is presented as a motional picture area in the displayed picture. In the motion and motion-vector detecting circuit 11, the control signals $\theta_1$ and $\theta_2$ detected on the basis of the interframe difference signal of the input sequentially scanned picture signal control the motion-compensation buffer memories 9, 10 as described above, so as to form the motion-compensated interpolated picture signal in which the ambiguity and the judder caused by the picture motion are compensated regarding the motional picture area. Thereafter, when the motion-compensated interpolated picture signal and the linear interpolated picture signal are added to each other under the mutual weighting, another control signal $\theta_3$, is formed for individually controlling adjustable coefficient multipliers 8 and 13 such as the weighting ratio of the interpolated picture signal presenting the smaller interframe difference signal is increased.

Accordingly, the linear interpolated picture signal derived from the linear interpolation filter consisting of a frame memory 3, coefficient multipliers 5, 6 and an adder 7 is supplied to an adjustable coefficient multiplier 8, meanwhile the motion-compensated interpolated picture signal derived from the motion-compensation buffer memories 9, 10 is supplied to another adjustable coefficient multiplier 13. After respective coefficients l and (1−l) of these adjustable coefficient multipliers 8 and 13 are complementally adjusted by the above described control signal $\theta_3$ derived from the motion and motion-vector detecting circuit 11, respective output picture signals of these adjustable coefficient multipliers 8 and 13 are mutually added in an adder 14, so as to obtain a frame-number converted output sequentially-scanned picture signal of M line/L frame system. In this situation, concerning the picture signal derived from the panned TV camera, the large area background picture presenting the motional picture area in the displayed picture becomes the conversion output picture in which the ambiguity and the judder caused by the picture motion are mitigated and the motion-compensated interpolated picture signal component is increased, meanwhile the moving body picture presenting the stationary picture area in the displayed picture becomes the conversion output picture in which the faultless linear-interpolated picture signal component formed by the linear interpolation is increased. As a result, in comparison with the conventional situation where the linear interpolation only is effected, the frame-number converted output picture signal accompanied with the extreme mitigation of the picture quality deterioration caused by the picture motion.

However, according to the prior art as described in the specification of aforesaid Japanese patent application, although sufficient effects can be obtained upon the motional picture based on the panning and the tilting of the TV camera following a specified target as mentioned before, such a defect is brought out that sufficient effects cannot be obtained upon a special picture in which, for instance, as shown in FIGS. 4(a) to 4(e), two automobiles A and B are running in mutually opposite directions in the same scene. It is because, according to the prior faculty of motion compensation as described in the aforesaid specification, only one motion vector can be detected regarding the same scene. It is aimed by the present invention that the picture quality deterioration accompanied with the frame number conversion can be mitigated even upon the special picture as described above.

Figure 5:
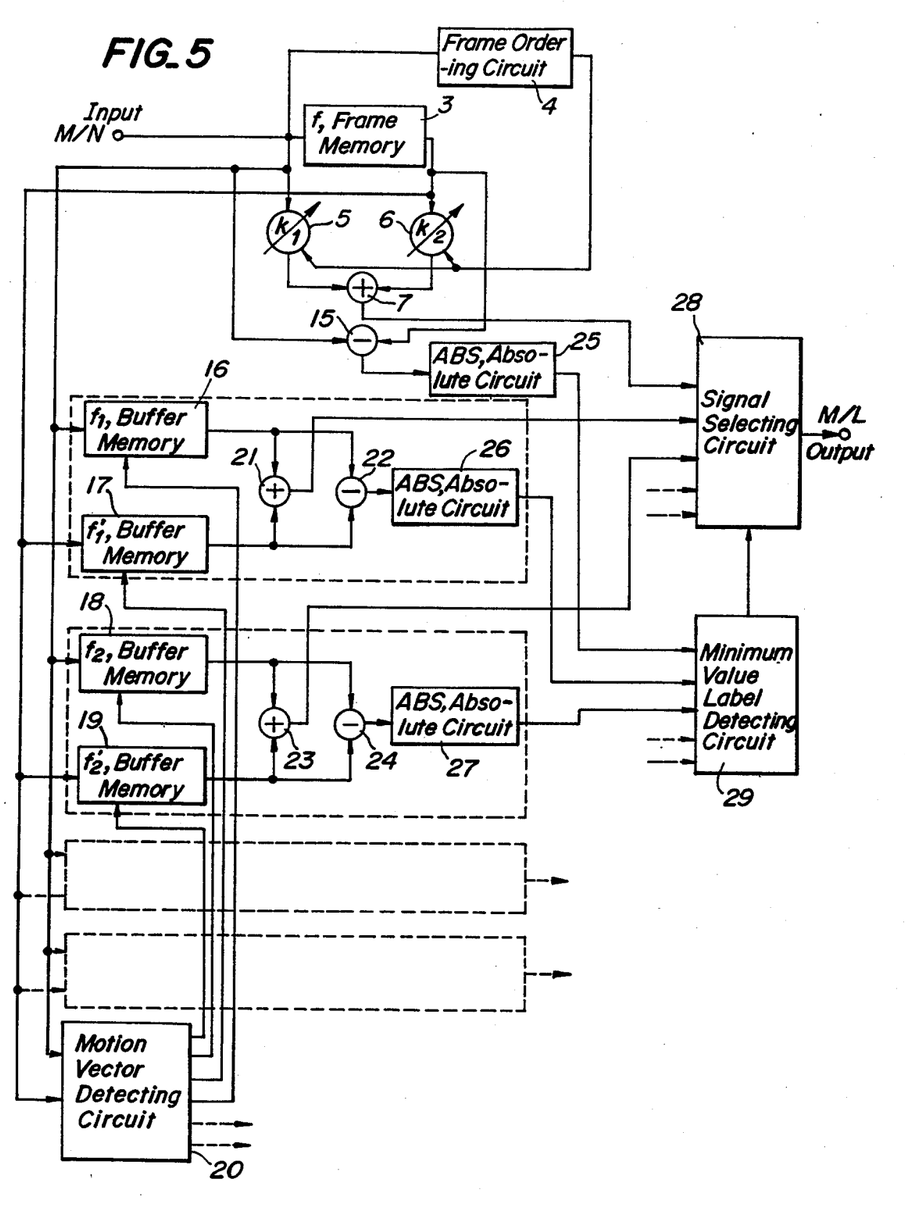
FIG. 5 is a block diagram showing an example of the constitution of a TV system conversion apparatus according to the present invention.

An example of the structure of the TV system conversion apparatus according to the present invention is shown in FIG. 5. As is apparent from the comparison between the structure of the apparatus according to the present invention as shown in FIG. 5 and that as described in the aforesaid specification and as shown in FIG. 3, the former takes a step forward from the latter. In FIG. 3, only one pair of motion-compensation buffer memories 9 and 10 is employed, meanwhile, in FIG. 5, plural pairs of motion-compensation buffer memories 16, 17, 18, 19 and so on are employed. So that, according to the present invention, plural conspicuous targets moving in the opposite directions in the same scene as shown in FIGS. 4(a) to 4(e) can be expected to be followed by any means of the same TV camera.

Furthermore, in FIG. 3, the linear-interpolated picture signal derived from the adder 7 and the motion-compensated interpolated picture signal derived from the adder 12 are multiplied by the complementally adjustable coefficients 1 and 1−1 respectively before added to each other. Meanwhile, in FIG. 5, firstly, the linear-interpolated picture signal of the new frame, which is formed of the original picture signals of two continued frames N and N+1 in the circuit consisting of a frame memory 3, a frame ordering circuit 4, coefficient multipliers 5, 6 and an adder 7 similarly as in FIG. 3, and the plural motion-compensated interpolated picture signals, which are formed, in adders 21, 23 and so on, of the plural motion-compensated picture signals of two continued frames N and N+1 derived from motion-compensation buffer memories 16, 17, 18, 19 and so on controlled by the plural motion vectors derived from a motion sector detecting circuit 20, are prepared, as well as absolute values of the respective interframe differences between the original picture signals of those frames N and N+1 and between the plural motion-compensated picture signals of those frames N and N+1 are applied from absolute circuits 25, 26, 27 and so on to a minimum value label detecting circuit 29, so as to obtain the minimum value of those absolute values under the mutual comparison thereof. Thereafter, either one corresponding to the obtained minimum absolute value is selected among the linear-interpolated picture signal and the plural motion-compensated interpolated picture signals in a signal selecting circuit 28, so as to form the output picture signal of the system conversion from M line/N frame to M line/L frame.

In succession to the above description of the principal portion of the TV system conversion apparatus according to the present invention, an example of the detailed structure of the motion vector detecting circuit 20 consisting in the apparatus concerned will be described hereinafter, so as to clarify the accurate detection of the motion vector corresponding to plural conspicuous moving targets in the same scene.

The detection of the motion vector:

As described before, in the TV system conversion apparatus according to the present invention, the motion vector detecting circuit 20 is provided as shown in FIG. 5, so as to form the interpolated picture signal which is appropriately motion-compensated regarding plural motional picture portions moving in individually different manners in the same scene. In this motion vector detecting circuit provided for effecting the accurate detection of the motion vector adaptive to the above situation, the picture presented by the picture signal to be converted in TV system is divided into plural picture areas corresponding to the number, the statistical position and the like of the aimed motional picture portions moving in different manners respectively and motion vectors are detected regarding those plural picture areas respectively. In this situation of motion vector detection, the detection of motion vectors weighted in response to the quantities thereof is effected.

The above detection of weighted motion vectors will be concretely described hereinafter by referring to FIGS. 6(a) to 6(f).

Figure 6A:
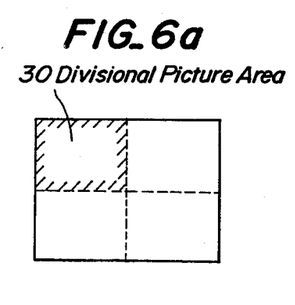
FIGS. 6(a), 6(b), 6(c), 6(d), 6(e) and 6(f) are diagrams successively showing examples of the manner of motion vector detection according to the present invention.
Figure 6B:
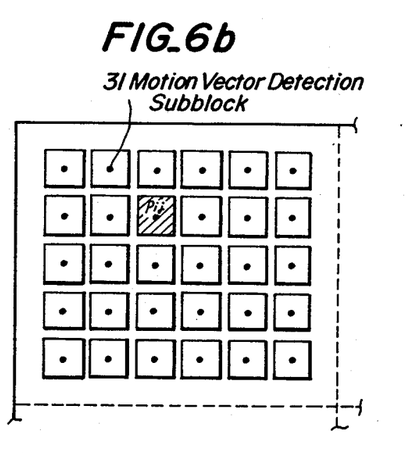

FIG. 6(a) shows an example of the picture division into plural picture areas as exemplified by four picture areas 30 up and down as well as right and left. In each of these divisional picture areas 30, plural small blocks 31 are provided, as shown in FIG. 6(b), for individually detecting an accurate motion vector. These small blocks 31 are provided, for instance, by one thousand per one divisional area 30, that is, four thousands as a whole picture as shown in FIG. 6(a).

Figure 6C:
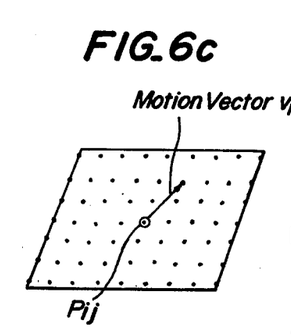

The size of the small block 31 relative to that of the whole picture is set up in consideration of the maximum value of the motion vector to be detected. The number of picture elements contained in this size of the small block 31 is set up as shown in FIG. 6(c), for instance, by every four lines up and down as well as by every twenty samples right and left. Accordingly, about 320 motion vectors $v_n$ pointing from the picture element Pij centering the small block 31 to each of those samples can be estimated.

For the motion vector detection effected by employing the above group of small blocks 31, the well-known matching method and the like can be adopted. The outline of the matching method is described under the omission of details as follows.

With respect to picture signals of two continued frames N and N+1, each of those small blocks of the preceding frame N are moved along various motion vectors and then each of differences between those moved small blocks of the preceding frame N and the original small blocks of the subsequent frame N+1 are examined. As a result, the required motion vector is obtained as one of the above various motion vectors which corresponds to the smallest of the total sum of these differences examined regarding each of those small blocks. This situation can be presented by the following equation.

$$DVn = \sum_{ij=1}^{m} dvn\, Pij$$

where DVn denotes the total sum of the difference between the preceding frame N moved along the vector $v_n$ and the subsequent frame N+1, dvnP denotes the difference of the picture signal restricted by the small block Pij between two continued frames N and N+1, and, m denotes the number of small blocks 31.

The motion vector detection expressed by the above equation has a defect such that any motion vector is detected regardless of the size of the motional picture portion presenting a uniform motion and the magnitude of the picture motion and hence is insufficient for being applied to the apparatus according to the present invention. It is because, although the picture is divided into plural areas 30, plural motional picture portions moving in various manners are occasionally contained further in the same divided picture area 30, as well as the conspicuous motional picture portion having a smaller area is occasionally contained among the most of the other picture portions in the area 30 concerned.

Consequently, in the motion vector detection applicable to the apparatus according to the present invention, the motion vector $v_n$ corresponding to the aforesaid smallest interframe difference is not directly obtained from the total sum of those interframe differences, but is obtained from the product $W_n \times DV_n$ of the above total sum $DV_n$ multiplied by a necessary weighting factor $W_n$.

Figure 6D:
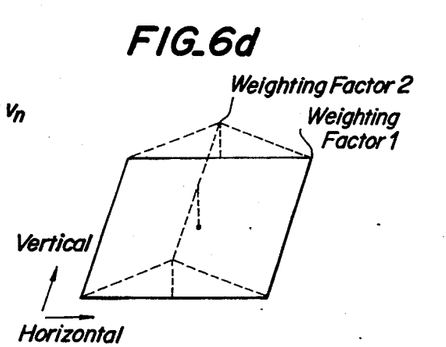
Figure 6E:
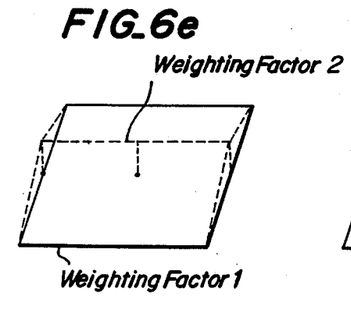
Figure 6F:
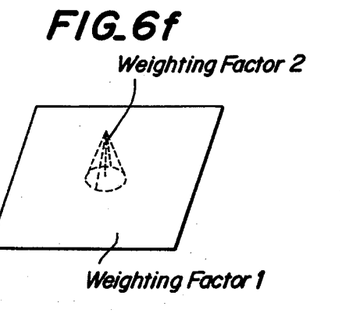

FIGS. 6(d) to 6(f) show various examples of this weighting factor $W_n$. Particularly, FIG. 6(a) shows an example in the situation where the comparatively large motion vector in the horizontal direction can be readily detected, as well as the small motion vector and the motion vector in the vertical direction can be hardly detected, so as to be applicable to the situation where it is required to detect the motion vector from the picture portion moving in the horizontal direction at a speed exceeding a certain speed.

FIG. 6(e) shows another example in the situation where the comparatively large motion vector in the vertical direction can be readily detected, meanwhile FIG. 6(f) shows still another example in the situation where both a comparatively large motion vectors in the horizontal and the vertical directions can be readily detected.

It is to be noticed that the weighting factor of the motion vector in the direction in which the motion vector can be readily detected in any of those situations as shown in FIGS. 6(d) to 6(f) should be small, meanwhile that in the direction in which the motion vector can be hardly detected should be large.

Next, an example of the circuitry including a signal selecting circuit 28 and a minimum value label detecting circuit 29 in FIG. 5, which is preferably applicable to the apparatus according to the present invention will be described hereinafter.

The improvement of picture quality obtained by the motion-compensated interpolated picture signal:

It has been described hitherto that the interpolated picture signal required for obtaining the system conversion output picture signal is selected from the linear-interpolated picture signal and the plural motion-compensated interpolated picture signals, in response to the minimum of the absolute values of the interframe differences on the minimum of the total sums multiplied by the weighting factors of those interframe differences. However, when the interpolated picture signal is selected as described above only with respect to the sample concerned in the picture, the picture quality deterioration such as so-called judder is occasionally caused, for instance, at the mutual connection contour between the linear-interpolated picture portion and the plural motion-compensated interpolated picture portions or between the plural motion-compensated interpolated picture portions themselves.

Figure 7:
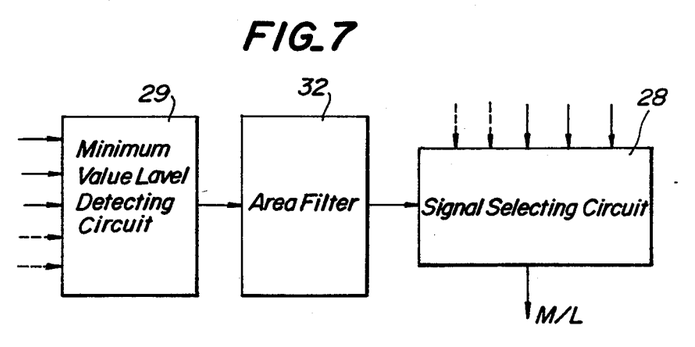
FIG. 7 is a block diagram showing an outlined example of a principal portion of the TV system conversion apparatus according to the present invention.

FIG. 7 shows an example of the circuitry provided for preventing the above picture quality deterioration. In this connection, the signal selecting circuit 28 and the minimum value label detecting circuit 29 are the same as those of the exemplified circuitry of the apparatus according to the present invention as shown in FIG. 5 and an area filter 32 is further provided therebetween in FIG. 7.

Figure 8:
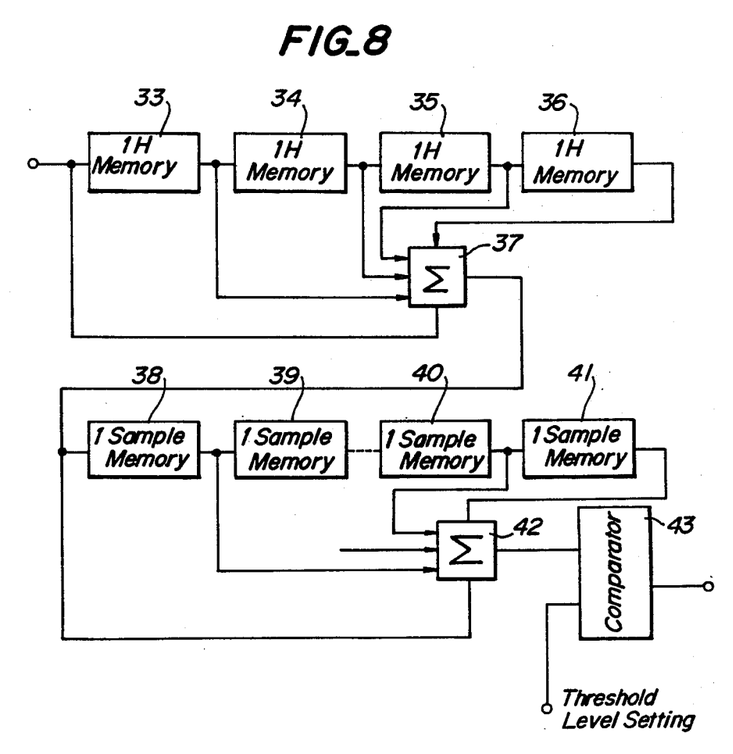
FIG. 8 is a block diagram showing an example of a further principal portion of the same.

This area filter 32 consists, for instance, of plural 1H memories 33 to 36, plural one-sample memories 38 to 41 and the like, as shown in FIG. 8, so as to form a two dimensional group of sample areas.

Figure 9:
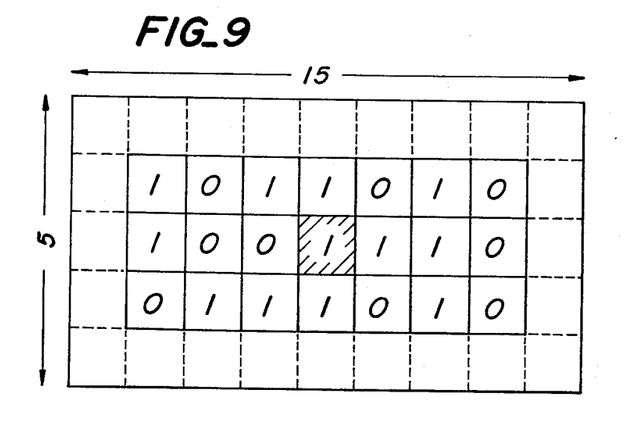
FIG. 9 is a diagram showing an example of the manner of operation of the principal portion of the same.

FIG. 9 shows an example of the two-dimensional group of sample areas centred by the sample concerned together with data presented therein respectively. In this example, 75 sample areas consisting of 5 samples in the vertical direction and 15 samples in the horizontal direction are provided together with the data indicated by labels "0" and "1" therein individually. These two kinds of labels can be regarded as corresponding, for instance, to two kinds of motion vectors. In the circuitry as shown in FIG. 5, the interpolated picture signal labeled by the datum "1" presented in the hatched central sample area in FIG. 9 corresponding to the sample concerned is selected. That is, in this exemplified circuitry, the respective numbers of the labels "0" and "1" contained in each of those sample areas are examined and thereafter individually compared with predetermined threshold levels of those numbers through the comparator 43 in FIG. 8, so as to output the interpolated picture signal corresponding to the label, the number of which exceeds the threshold level. Namely, the interpolated picture signal corresponding to the label, the number of which exceeds about the half 38 of the total number 75 of the sample areas as shown in FIG. 9.

In this connection, the matter in the situation where three kinds or more of the labels are employed, because the interpolated picture signal corresponding to the label having the greatest number is selected.

Figure 10:
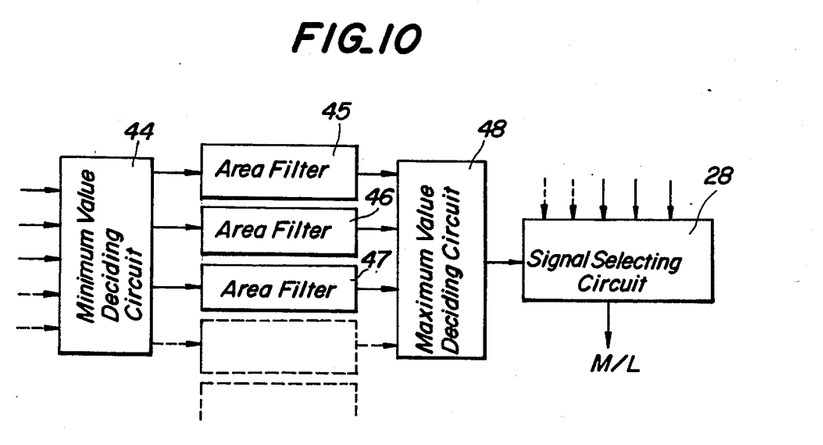
FIG. 10 is a block diagram showing an example of another principal portion of the same.

FIG. 10 shows another example of the circuitry provided for preventing the picture quality deterioration such as the judder. In this exemplified circuitry, plural area filters 45, 46, 47 and so on being similar as described before are individually provided for each of plural outputs of the minimum value deciding circuit 44, meanwhile the maximum value deciding circuit 48 is provided for deciding the maximum of output values of these area filters as the label corresponding to the sample concerned, so as to select the interpolated picture signal corresponding thereto through the signal selecting circuit 28.

By employing the apparatus as described hitherto, the picture quality deterioration accompanied with the frame number conversion such as the ambiguity, the judder and the like can be fairly mitigated, even when a plurality of comparatively conspicuous picture portions individually moving in different manners are contained in the same scene.

However, even in this apparatus, any erroneous operation has been occasionally caused with respect to a certain kind of picture signal, when the minimum of absolute values of the plural interframe differences is selected.

Figure 11:
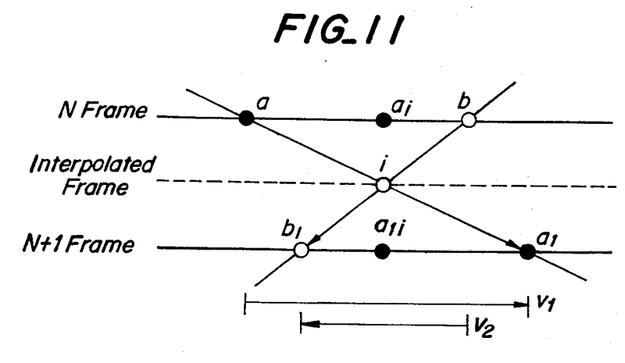
FIGS. 11, 12 and 13 are diagrams successively showing the manner of motion compensation based on motion vectors detected according to the present invention.

For example, in FIG. 11 showing the situation where a black target "a" is moving in front of a white backgroud, a black image thereof interpolated on the basis of the motion vector $v_1$ is correct, meanwhile a white image thereof interpolated on the basis of the motion vector $v_2$ is erroneous. In this connection, those motion vectors $v_1$ and $v_2$ are detected from the picture area in which the black target concerned is moving and from the other else picture area respectively.

In the situation as shown in FIG. 11, the motion-compensated interpolated picture signal at the point "i" in the interpolated frame is selected as follows.

The motion-compensated picture signals of two continued frames N and N+1 on the basis of the motion vector $v_1$ are respectively presented by an image $a_i$ positioned just above the point "i", which image is formed by moving the back target "a" in the right direction in the preceding frame N, and by an image $a_{1i}$ positioned just below the point "i", which image is formed by moving the black target "a" in the left direction in the subsequent frame N+1. Similarly, the motion-compensated picture signals of those frames on the basis of the motion vector $v_2$ are respectively presented by images $b_i$ and $b_{1i}$ (not shown). In this situation, for selecting the interpolated picture signal based on the correct motion vector, it is required to compare the absolute values of interframe differences between the former images $a_i$ and $a_{1i}$ and between the latter images $b_i$ and $b_{1i}$. However, in this situation, both of these absolute values become zero, so that the most adaptive value for selecting the interpolated picture signal cannot be specified. It is because the situation the black target "a" is moving in front of the white background is supposed as described above. However, such a situation can be fairly realized in practice.

Consequently, the correct decision effected through the minimum value label detecting circuit 29 becomes impossible in this situation and hence it can not be decided whether the motion-compensated interpolated picture signal based on the motion vector $v_1$ or that based on the motion vector $v_2$ should be selected. In the above exemplified situation, the matter based on two motion vectors is examined. However, even if the number of motion vectors is further increased, the matter is the same as in the above situation, and, as a result, white images and black images are selected at random as the motion-compensated interpolated image signal as for the moving black target, and hence, the judder such as the white images and the black images are mutually changed to each other is maintained.

As additional object of the present invention is to prevent the above erroneous operation of the apparatus according to the present invention.

Another additional object of the present invention is to attain the high quality frame number conversion of television picture signal by removing the ambiguity and the judder caused on the special picture such as the black target is moving in front of the white background.

Consequently, the TV system conversion apparatus featured as described in the earlier description according to the present invention is additionally featured in that the pattern matching based on the plural detected motion vectors is applied upon the plural motion-compensated picture signals, so as to facilitate the detection of the most adaptive motion vector and hence to decide the most adaptive motion-compensated interpolated picture signal required for obtaining the interframe interpolation picture signal.

The algorism of improved operation and another example of the structure of the TV system conversion apparatus according to the present invention will be described in detail by referring to the drawings hereinafter.

Figure 12:
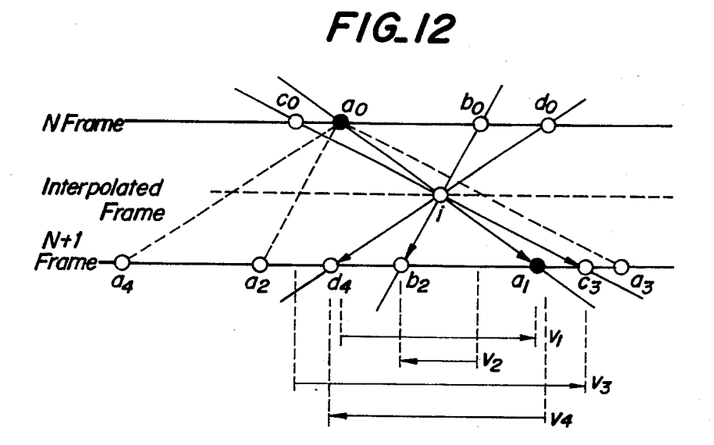
Figure 13:
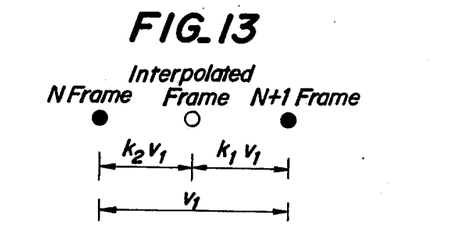
Figure 14:
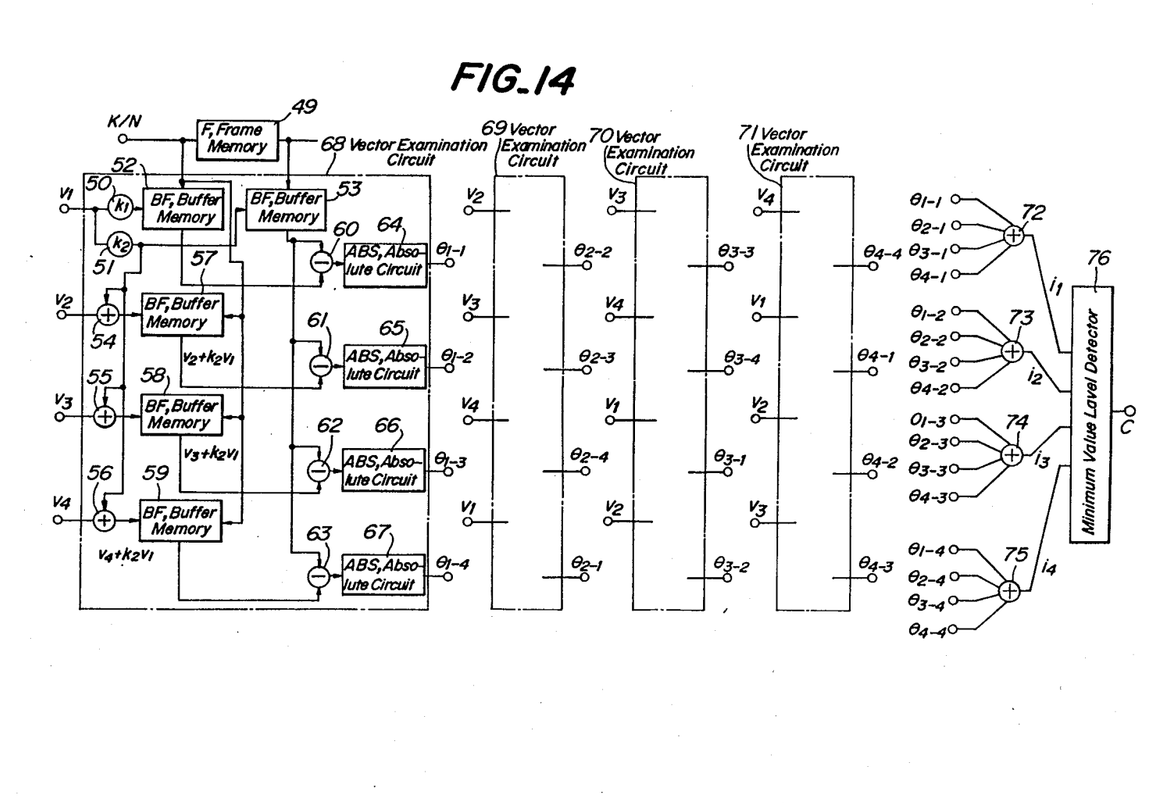
FIG. 14 is a block diagram showing another example of the constitution of the TV system conversion apparatus according to the present invention.

FIGS. 12 and 13 are vector diagrams for explaining the above new algorism, meanwhile FIG. 14 is a block diagram showing the example of structure of only the principal portion of the apparatus concerned. In the vector diagrams as exemplified in FIGS. 12 and 13, the number of motion vectors detected by the motion vector detecting circuit 20 as shown in FIG. 5 is assumed to be 4. However, it is of course that this number of motion vectors can be arbitrarily changed. In this explanation, it is supposed similarly as shown in FIG. 11 that the black target "a" is moving in front of the white background in the picture to be examined for obtaining the motion-compensated interpolated picture signal. With respect to the interpolation point "i" in the interpolated frame, the correct black image can be obtained by effecting the interpolation between the motion-compensated picture signals obtained along the motion vector $v_1$ from the black images $a_0$ and $a_1$ in the two continued frames N and N+1 respectively. The motion vectors $v_2$ to $v_4$ have been detected from other neighboring motional picture areas and hence should be regarded as erroneous with respect to the interpolation point "i" concerned. It is because, if these motion vectors are employed, white images $b_0$, $c_0$ and $d_0$ are obtained as the motion-compensated picture in the preceding frame N with respect to the interpolation point "i" in the interpolated frame and, as a result, the motion-compensated interpolated picture based on these white images $b_0$, $c_0$ and $d_0$ along these erroneous motion vectors $v_2$ to $v_4$ becomes a white image to be accompanied with the judder.

In view from the interpolation point "i", the motion-compensated interpolated picture should be obtained on the basis of either one of the images $a_0$, $b_0$, $c_0$ and $d_0$ obtained by the motion compensation along the motion vectors $v_1$ to $v_4$ respectively. However, it is feared that the erroneous operation is caused by simply detecting the motion vector label as the minimum of absolute values of the interframe differences between the motioncompensated picture signals in the two continued frames N and N+1, as described before. Accordingly, in the above exemplified situation, the motion vector $v_1$ should be selected for the label of the interpolation relating to the interpolation point "i" concerned among the above described four motion vectors. As a result, with respect to the interpolation point "i" in the interpolated frame obtained by the frame number conversion, the motion-compensated picture signals based on the motion vectors $v_1$ and $v_2$ respectively in two continued frames N and N+1 should be compounded at the motion-compensated interpolation point in the interpolated frame on the basis of two corrected motion vectors $k_2v_1$ and $k_1v_1$ which are obtained by the proportional allotment effected by multiplying the original motion vector $v_1$ with complemental factors $k_1$ and $k_2$ having the mutual relation $k_1+k_2=1$, as shown in FIG. 13.

Consequently, the most adaptive motion-compensated interpolated picture signal can be selected according to the algorism as described hereinafter.

Firstly, with respect to the interpolation point "i" on the interpolated frame, picture elements $a_0$, $b_0$, $c_0$ and $d_0$ respectively corresponding to the motion vectors $v_1$ to $v_4$ are set up in the preceding frame N, as shown in FIG. 12. Next, with respect to the picture element $a_0$ in the frame N, the motion-compensated images $a_1$ to $a_4$ based on the motion vector $v_1$ to $v_4$ respectively are extracted in the subsequent frame N+1, and thereafter the respective interframe differences between the picture element $a_0$ in the frame N and those images $a_1$ to $a_4$ in the frame N+1 are calculated through the vector examination circuit 68 as shown in FIG. 14. Among these interframe differences, that between the picture $a_0$ and the image $a_1$ becomes zero, meanwhile those between the picture $a_0$ and the other images $a_2$ to $a_4$ don't become zero, since against the black picture element $a_0$, the image $a_1$ presents the black level, meanwhile the other images $a_2$ to $a_4$ present the white level.

The similar procedures with respect to the other picture elements $b_0$, $c_0$ and $d_0$ set up in the preceding frame N are effected respectively through the vector examination circuits 69, 70 and 71 as shown in FIG. 14. In this connection with FIG. 12, only the motion-compensated images $b_2$, $c_3$ and $d_4$ respectively based on the motion vectors $v_2$, $v_3$ and $v_4$ in the subsequent frame N+1 with respect to the picture elements $b_0$, $c_0$ and $d_0$ are indicated, meanwhile the other images are omitted for the simplicity.

The above exemplified algorism is the very procedure according to the pattern matching for obtaining the most adaptive motion-compensated interpolated picture signal based on the four motion vectors. In this exemplified algorism, the total number of the combinations between the picture elements in the preceding frame N and the motion-compensated images in the subsequent frame N+1 is 16. When the absolute value of the interframe difference, for instance, between the picture element $a_0$ and the image $a_1$ is denoted by $\theta_{1-1}$, the absolute values of the interframe differences relating to the interpolation point "a" can be presented as follows.

$$\theta_{1-1}=0, \theta_{1-2}\neq 0, \theta_{1-3}\neq 0, \theta_{1-4}\neq 0$$

Similarly, those relating to the other interpolation points "b", "c", "d" in the same situation can be presented as follows.

$$\theta_{2-1}=\theta_{2-2}=\theta_{2-3}=\theta_{2-4}=0$$

$$\theta_{3-2}=\theta_{3-2}=\theta_{3-3}=\theta_{3-4}=0$$

$$\theta_{4-1}=\theta_{4-2}=\theta_{4-3}=\theta_{4-4}=0$$

The above exemplified combinations between the picture elements and the images can be rearranged with respect to the motion vectors as follows.

For instance, with respect to the motion vector $v_1$, the following arrangement is obtained, $$\theta_{1-1}=\theta_{2-1}=\theta_{3-1}=\theta_{4-1}=0$$

Similarly, the following arrangements are obtained with respect to the other motion vectors $v_2$, $v_3$, $v_4$ respectively.

$$\theta_{1-2}\neq 0, \theta_{2-2}=\theta_{3-2}=\theta_{4-2}=0$$

$$\theta_{1-3}\neq 0, \theta_{2-3}=\theta_{3-3}=\theta_{4-3}=0$$

$$\theta_{1-4}\neq 0, \theta_{2-4}=\theta_{3-4}=\theta_{4-4}=0$$

In this situation, among the sums $i_1$ to $i_4$ of the absolute values of interframe differences respectively relating to the motion vectors $v_1$ and $v_2$, $v_3$, $v_4$, obtained through the adders 72 to 75 as shown in FIG. 14, the sum $i_1$ becomes the smallest and hence the motion vector giving this smallest sum $i_1$ through the minimum value label detector 76 as shown in FIG. 14, that is, the motion vector $v_1$ becomes the correct motion vector adaptive to the moving target concerned in this situation.

Similarly, in the situation where the motion vector $v_2$ is correct, the sum $i_2$ derived from the adder 73 becomes the smallest, as well as the correct motion vector labels can be detected according to the same algorism with respect to the other motion vectors $v_3$ and $v_4$ also.

As a result of the described above, the most adaptive motion-compensated interpolated picture signal can be obtained at the motion-compensated interpolation point corrected by the control signal C corresponding to the correct motion vector decided through the minimum value label detector 76.

As is apparent from the described above in detail, in the frame number conversion of the television picture signal effected through the TV system conversion apparatus according to the present invention, even if plural conspicuous targets move in various manners in the same scene, the picture quality deterioration accompanied with the frame number conversion such as the ambiguity and the judder of the picture can be sufficiently mitigated.

In addition, according to the new measures of coefficient multiplication applied on the motion vector detection effected in the apparatus of the present invention, the conspicuous picture motion can be previously emphasized and hence can be readily detected, so that the further improved frame number conversion can be realized.

Moreover, according to the picture signal processing effected through picture area filters arranged between the minimum value label detector and the picture signal selector, the judder caused along the connection contour between different interpolated picture areas can be mitigated also and hence the still further improved frame number conversion can be attained.

On the other hand, according to the novel agorism adopted by the present invention, the most adaptive motion-compensated interpolated picture signal can be exactly selected on the basis of the detection of the most adaptive motion vector and hence the picture quality deterioration caused the judder can be exactly prevented.

In this connection, the TV system conversion apparatus according to the present invention can be employed for the system conversion between any TV systems, for instance, between the standard TV systems, between the high definition TV system and the standard TV system, and the like.

What is claimed is:

1. A TV system conversion apparatus which is provided for converting the number of picture frames employed in TV system, characterized by comprising means for forming a linear interpolated picture signal of a new frame from original picture signals of two continued frames of Nos. N and N+1 through the linear interpolation, means for detecting motion vectors individually corresponding to the directions and the distances of picture motions in a plurality of picture regions formed by dividing the original pictures respectively, means for forming a plurality of motion-compensated interpolated picture signals of said new frame from a plurality of motion-compensated picture signals of said two continued frames of Nos. N and N+1 formed by compensating said original picture signals in response to said motion vectors and means for selecting in response to absolute values of respective interframe differences between said original picture signals of said two continued frames of Nos. N and N+1 and said plurality of motion-compensated picture signals of said two continued frames of Nos. N and N+1 either said linear interpolated picture signal or said motion-compensated interpolated picture signal corresponding to the smallest of said absolute values of interframe differences, so as to form a converted output picture signal adapted to the picture motion.

2. A TV system conversion apparatus as claimed in claim 1, wherein the formation of said plurality of motion-compensated interporated picture signals of said new frame is effected by forming said plurality of motion-compensated interpolated picture signals from the plurality of motion-compensated picture signals of said two continued frames of Nos. N and N+1 formed by adaptively compensating said original picture signals in response to said motion vectors mutually weighted with complemental weighting factors, so as to obtain the most adaptive motion-compensated interpolated picture signal.

3. A TV system conversion apparatus as claimed in claim 1, characterized by further comprising means for forming compounds of absolute values of the interframe differences of said motion-compensated interpolated picture signals relating in common to each of said motion vectors corresponding to the picture motions in specified one of said picture regions in said new picture frame respectively and means for deciding the selection of said motion-compensated picture signal in response to the motion vector corresponding to the smallest of said compounds as for said converted output picture signal adapted to the picture motion in said specified picture region.

4. A TV system conversion apparatus as claimed in claim 1, characterized by further comprising means for forming compounds of absolute values of the interframe differences of said original picture signals of two continued frames of Nos. N and N+1 relating to each of said motion vectors corresponding to the picture motions in specified one of said picture regions in said new picture frame respectively and means for deciding the selection of said motion-compensated picture signal in response to the motion vector corresponding to the smallest of said compounds as for said converted output picture signal adapted to the picture motion in said specified picture frame.

5. A TV system conversion apparatus as claimed in claim 1, wherein the detection of the smallest of said interframe differences is effected by detecting the smallest of weighted total sums of the interframe differences between said two continued frames of Nos. N and N+1 in each of small blocks formed by further dividing each of said picture regions, which total sums are weighted by being multiplied with weighting factors respectively corresponding to the motion vectors.

6. A TV system conversion apparatus as claimed in claim 5, wherein at least one of filter means for smoothing contours between said picture regions in which said converted output picture signal respectively adapted to the different picture motions are formed is comprised between a means for effecting the detection of the smallest of said weighted total sum of the interframe differences and said means for selecting the interpolated picture signals in response to the interframe differences.

* * * * *